United States Patent

Nishikori et al.

(10) Patent No.: US 11,095,379 B2
(45) Date of Patent: Aug. 17, 2021

(54) DATA PROCESSING UNIT AND INFORMATION PROCESSING DEVICE

(71) Applicant: YAMAHA CORPORATION, Hamamatsu (JP)

(72) Inventors: Taku Nishikori, Hamamatsu (JP); Masahiro Mazuka, Hamamatsu (JP)

(73) Assignee: YAMAHA CORPORATION, Hamamatsu (JP)

( * ) Notice: Subject to any disclaimer, the term of this patent is extended or adjusted under 35 U.S.C. 154(b) by 0 days.

(21) Appl. No.: 16/570,060

(22) Filed: Sep. 13, 2019

(65) Prior Publication Data

US 2020/0007251 A1 Jan. 2, 2020

Related U.S. Application Data

(63) Continuation of application No. PCT/JP2018/010030, filed on Mar. 14, 2018.

(30) Foreign Application Priority Data

Mar. 17, 2017 (JP) .............................. JP2017-053762

(51) Int. Cl.
| | |
|---|---|
| *H04H 60/04* | (2008.01) |
| *G06F 3/16* | (2006.01) |
| *H04J 3/06* | (2006.01) |

(52) U.S. Cl.
CPC ............ *H04H 60/04* (2013.01); *G06F 3/162* (2013.01); *H04J 3/0632* (2013.01); *H04J 3/0688* (2013.01)

(58) Field of Classification Search
CPC . G06F 3/16; G06F 3/162; G06F 3/165; G06F 3/1454; G06F 3/02; G06F 3/0227;

(Continued)

(56) References Cited

U.S. PATENT DOCUMENTS

| | | | |
|---|---|---|---|
| 4,438,402 A | 3/1984 | Cullen | |
| 8,893,013 B1 * | 11/2014 | Groves | ................ G06F 3/1454 715/740 |

(Continued)

FOREIGN PATENT DOCUMENTS

| | | |
|---|---|---|
| JP | H10340171 A | 12/1998 |
| JP | 2009217909 A | 9/2009 |
| JP | 2017017368 A | 1/2017 |

OTHER PUBLICATIONS

International Search Report issued in International Application No. PCT/JP2018/010030 dated Jun. 12, 2018. English translation provided.

(Continued)

*Primary Examiner* — Andrew C Flanders

(74) *Attorney, Agent, or Firm* — Rossi, Kimms & McDowell LLP

(57) ABSTRACT

A data processing unit includes a processing circuit that is configured to process data based on a value of a first parameter, a first operator that is selectively set to one of a first state and a second state that are physically identified, a second operator that is set to a physical state indicating the value of the first parameter, and a processor that is configured to set the value of the first parameter indicated by the physical state of the second operator in the processing circuit in a case where the first operator is in the first state at a time of activating the data processing unit, and set a value of the first parameter supplied from the information processing device in the processing circuit in a case where the first operator is in the second state at the time of activating the data processing unit.

14 Claims, 10 Drawing Sheets

(58) Field of Classification Search
CPC ........ G06F 3/023; G06F 3/048; G06F 3/0484;
G06F 3/04842; G06F 3/04845; G06F
3/04847; G06F 9/452; G06F 13/10; G06F
13/102; G06F 13/015; G06F 15/17306;
G06F 15/17325; G06F 15/177; G06F
2203/0383; H04H 60/04; H04L 67/38
See application file for complete search history.

(56) References Cited

U.S. PATENT DOCUMENTS

| | | | |
|---|---|---|---|
| 9,753,689 B2 | 9/2017 | Aiso | |
| 2009/0234477 A1 | 9/2009 | Sekido | |
| 2010/0013759 A1* | 1/2010 | Wu | G06F 3/1415 345/156 |
| 2010/0060549 A1* | 3/2010 | Tsern | G06F 3/1454 345/2.1 |
| 2011/0224811 A1* | 9/2011 | Lauwers | G06F 3/16 700/94 |
| 2012/0023267 A1* | 1/2012 | Sasaki | H04N 21/43635 710/14 |
| 2012/0047443 A1* | 2/2012 | Tarkoma | G06F 9/452 715/744 |
| 2013/0050084 A1* | 2/2013 | Soffer | G06F 21/85 345/163 |
| 2013/0246932 A1* | 9/2013 | Zaveri | G06F 3/04815 715/740 |
| 2013/0304794 A1* | 11/2013 | Verma | H04N 21/47205 709/201 |
| 2013/0346858 A1* | 12/2013 | Neyrinck | G06F 3/038 715/716 |
| 2014/0019652 A1* | 1/2014 | Soffer | G06F 21/84 710/73 |
| 2014/0047339 A1* | 2/2014 | Epstein | G06F 3/023 715/719 |
| 2014/0282032 A1* | 9/2014 | Brown | G06F 3/0484 715/738 |
| 2015/0067035 A1* | 3/2015 | Sullad | H04L 67/08 709/203 |
| 2015/0215570 A1* | 7/2015 | Leibow | G06F 3/14 386/231 |
| 2015/0256895 A1* | 9/2015 | Young | G06F 3/0481 725/37 |
| 2015/0261410 A1* | 9/2015 | Kumar | H04W 4/08 715/716 |
| 2016/0260414 A1* | 9/2016 | Yang | G06F 3/04842 |
| 2017/0293507 A1* | 10/2017 | Liu | G06F 1/1626 |

OTHER PUBLICATIONS

Office Action issued in Chinese Appln. No. 201880017263.X dated Aug. 26, 2020. English translation provided.

English translation of Written Opinion issued in International Application No. PCT/JP2018/010030 dated Jun. 12, 2018, previously cited in IDS filed Sep. 13, 2019.

Extended European Search Report issued in European Appln. No. 18767587.1 dated Nov. 20, 2020.

Office Action issued in Japanese Appln No. 2017-053762 dated Apr. 13, 2021. English machine translation provided.

'Tio1608—D Instruction Manual, [online], Japan, Yamaha Corporation, 2016, pp. 1-26, [Search on Mar. 29, 2021], Internet <URL:https://jp.yamaha.com/files/download/other_assets/7/614057/tio1608d_ja_om_c0.pdf>.

Office Action issued in Chinese Appln. No. 201880017263.X dated May 11, 2021. English machine translation provided.

* cited by examiner

FIG. 4

| ITEM | POSSIBLE VALUE | DIP SWITCH | HOST CONTROL | CURRENT VALUE |
|---|---|---|---|---|
| INPUT CLOCK SEQUENCE (Fs) | (44.1kHz, 48kHz) | — | — | 48kHz |
| INPUT CLOCK MAGNIFICATION | 1Fs, 2Fs, 4Fs | 1, 2 | ○ | 1Fs |
| INPUT FRAME FORMAT | (48kHz, 96kHz) | — | — | 96kHz |
| NUMBER OF INPUT CHANNELS | (64ch, 56ch) | — | — | 64ch |
| OUTPUT FRAME FORMAT | Same as Input, 48kHz, 96kHz | — | ○ | Same as Input |
| NUMBER OF OUTPUT CHANNELS | Same as Input, 64ch, 56ch | — | ○ | Same as Input |
| INPUT SRC | OFF, ON | 3 | ○ | ON |
| INPUT SRC CLOCK | MADI IN, WCLK IN | 4 | ○ | MADI IN |
| OUTPUT SRC | OFF, ON | 5 | ○ | ON |
| OUTPUT SRC CLOCK | MADI IN, WCLK IN | 6 | ○ | MADI IN |
| STANDBY | OFF, ON | 7, 8 | — | — |

*FIG. 5*

| ITEM | HOST SIDE SETTING VALUE | CURRENT VALUE |
|---|---|---|
| INPUT CLOCK SEQUENCE (Fs) | — | 48kHz |
| INPUT CLOCK MAGNIFICATION | 1Fs | 1Fs |
| INPUT FRAME FORMAT | — | 96kHz |
| NUMBER OF INPUT CHANNELS | — | 64ch |
| OUTPUT FRAME FORMAT | Same as Input | Same as Input |
| NUMBER OF OUTPUT CHANNELS | Same as Input | Same as Input |
| INPUT SRC | OFF | ON |
| INPUT SRC CLOCK | MADI IN | MADI IN |
| OUTPUT SRC | OFF | ON |
| OUTPUT SRC CLOCK | MADI IN | MADI IN |

DATA PROCESSING UNIT AND INFORMATION PROCESSING DEVICE

CROSS REFERENCE TO RELATED APPLICATION(S)

This application is a continuation of International Patent Application No. PCT/JP2018/010030 filed on Mar. 14, 2018, which claims the benefit of priority of Japanese Patent Application No. 2017-053762 filed on Mar. 17, 2017, the contents of which are incorporated herein by reference in its entirety.

BACKGROUND OF THE INVENTION

1. Field of the Invention

The present disclosure relates to a data processing unit connected to an information processing device and including a processing circuit that processes data according to a parameter, and the information processing device detachably including such a data processing unit.

2. Description of the Related Art

In the related art, as a data processing unit connected to an information processing device and including a processing circuit that processes data according to a parameter, for example, a communication unit that is detachably mounted in a sound signal processing device such as a digital mixer or an amplifier device is known. The communication unit includes a communication circuit having a function of performing data communication using a specific protocol such as Multichannel Audio Digital Interface (MADI™), Dante™, CobraNet™, and the like, and a user attaches the communication unit having a data communication function of a desired protocol to the sound signal processing device and uses the communication unit.

In this type of communication unit, it is common that values of various parameters according to a communication protocol such as a sampling frequency, a frame format, the number of transmission channels (ch), a transmission channel number, a reception channel number, and a device ID can be set as parameters used for communication, and communication processing can be executed according to the set values of the parameters.

The following two methods are roughly considered as setting methods of the parameters. The first method is a method of providing the communication unit itself with a physical operator such as a DIP switch or a dial that can be operated and viewed by the user to receive the setting. The second method is a method of providing a function of receiving the setting of the parameter values to be used by the communication unit and providing a function of supplying the set values of the parameters to the communication unit at the time of activating the communication unit.

Further, as a technology related to setting of parameter values, although the sound signal processing device and the communication unit thereof are different examples, the one described in Patent Literature 1 is also known. Patent Literature 1 discloses that in a case where a printer device is provided with a function of setting a protocol of data exchange by a DIP switch, when a switch disposed on the printer device separately from the DIP switch is operated at the time of activating the device, the setting by the DIP switch is temporarily invalidated, and a protocol suitable for cooperation with a host computer for inspection is automatically set, and data can be exchanged with the host computer.
Patent Literature 1: JP-A-H10-340171

SUMMARY OF THE INVENTION

However, none of above-described related parameter setting methods is sufficiently convenient.

First, in the first method, there is a problem that it is necessary to provide the number of physical operators corresponding to all the parameters that may be set, and when the number of parameters increases, it becomes difficult to deal with cost and an arrangement space. Further, there is a problem that it is necessary to provide a corresponding operator for a parameter which is hardly operated, and it is wasteful to spend the cost and the arrangement space on the operator. Further, there is a problem that it is necessary to operate the operator for each unit, and when the unit is replaced due to problems or the like, the user needs to perform the setting again by operating the operator again.

On the other hand, the problem of the first method described above can be solved by the second method. That is, even if the number of parameters is large, if the setting is received by a graphical user interface (GUI), there is no problem in the arrangement space of the operator, and if the value of the parameter is stored on the sound signal processing device side, the same parameter value as before the exchange can be easily set in the new unit even if the communication unit is replaced.

However, in the second method, the function of receiving the setting of the value of the parameter used by the communication unit and the function of supplying and setting the value of the parameter to the communication unit need to be provided in advance on the sound signal processing device side. Therefore, there is a problem that the communication unit cannot be used in a sound signal processing device having no corresponding setting function. In addition, if the user does not sufficiently understand the setting function of each sound signal processing device, an appropriate setting operation cannot be performed.

Further, even in the method described in Patent Literature 1, when the DIP switch is not used, only a specific parameter value suitable for cooperation with the host computer for inspection is set, and it is not sufficient to perform the setting used in actual operation of the replaceable unit.

Here, the communication unit that performs data communication is described as an example of data processing, and the sound signal processing device is described as an example of the information processing device mounted with the communication unit. However, similar problems occur in other data processing units and information processing apparatuses as well.

A non-limited object of the present disclosure is to solve such a problem and to improve the convenience of setting a parameter in a data processing unit including a processing circuit that processes data according to the parameter.

In an aspect of the present disclosure, the data processing unit of the present disclosure is a data processing unit configured to be connected to an information processing device and is provided with a processing circuit that is configured to process data based on a value of a first parameter that has been set; a first operator that is selectively set by a user to one of a first state and a second state that are physically identified; a second operator that is set by the user to a physical state indicating the value of the first parameter; and a processor that is configured to set the value of the first parameter indicated by the physical state of the second operator in the processing circuit in a case where the first operator is in the first state at a time of activating the data processing unit, and set the value of the first parameter supplied from the information processing device in the processing circuit in a case where the first operator is in the second state at the time of activating the data processing unit.

In the data processing unit, the data processing performed by the processing circuit may be data transmission and/or data reception.

Further, it may be configured such that the processing circuit is configured to perform the processing based on a value of a second parameter in addition to the first parameter, and it is preferable that the processor is configured to set the value of the first parameter indicated by the physical state of the second operator and a predetermined value of the second parameter in the processing circuit in a case where the first operator is in the first state at the time of activating the data processing unit, and the processor sets a value of the first parameter and a value of the second parameter supplied from the information processing device in the processing circuit in a case where the first operator is in the second state at the time of activating the data processing unit.

Further, it is optional to provide a storage unit in which the predetermined value of the second parameter is stored in advance.

Further, it may be configured such that the processor is configured to set, in the processing circuit, values of the respective parameters individually supplied from the information processing device at arbitrary timing while the first operator is in the second state.

Further, it may be configured such that the processor is configured to notify the information processing device of the values of the respective parameters set in the processing circuit regardless of the state of the first operator.

Further, the information processing device according to another aspect of the present disclosure is an information processing device including the data processing unit as described above, and is provided with a supply unit that is configured to supply the value of the first parameter to the data processing unit in a case where the first operator is in the second state at the time of activating the data processing unit.

In the information processing device, the data processing unit may be detachable from the information processing device.

Further, it is optional to provide a first control unit that is configured to transmit the value of the first parameter set in the data processing unit to a storage unit based on a notification from the data processing unit, and at the time of activating the data processing unit, it is preferable that the supply unit supplies the value of the first parameter stored in the storage unit when the data processing unit is stopped last time to the data processing unit.

Further, it is optional to provide an editing unit that is configured to edit the value of the first parameter to be set in the data processing unit according to a user operation, and it is preferable that the supply unit supplies the edited value of the first parameter to the data processing unit in response to the value of the first parameter being edited by the editing unit, and the processor of the data processing unit sets, in the processing circuit, the value of the first parameter individually supplied from the information processing device at arbitrary timing while the first operator is in the second state.

Further, it is optional to provide an invalidation unit that is configured to invalidate editing by the editing unit while the first operator in the data processing unit is in the first state.

Alternatively, in any of the information processing devices described above, it is optional to provide a second control unit that is configured to transmit the value of the first parameter set in the data processing circuit of the data processing unit to a predetermined display based on a notification from the data processing unit. It may be configured such that the processor of the data processing unit notifies the information processing device of the value of the first parameters set in the processing circuit regardless of the state of the first operator.

In addition, the present disclosure can be implemented in any form such as a system, a method, a program, and a recording medium, in addition to being implemented as a device as described above.

BRIEF DESCRIPTION OF THE DRAWINGS

FIG. 4 shows an example of specifications of parameters handled by a parameter setting unit shown in FIG. 3.

FIG. 5 shows an example of data stored in the sound signal processing device regarding the parameters.

DETAILED DESCRIPTION OF THE EXEMPLARY EMBODIMENTS

Hereinafter, embodiments of the present disclosure will be described in detail with reference to the drawings.

Figure 1:
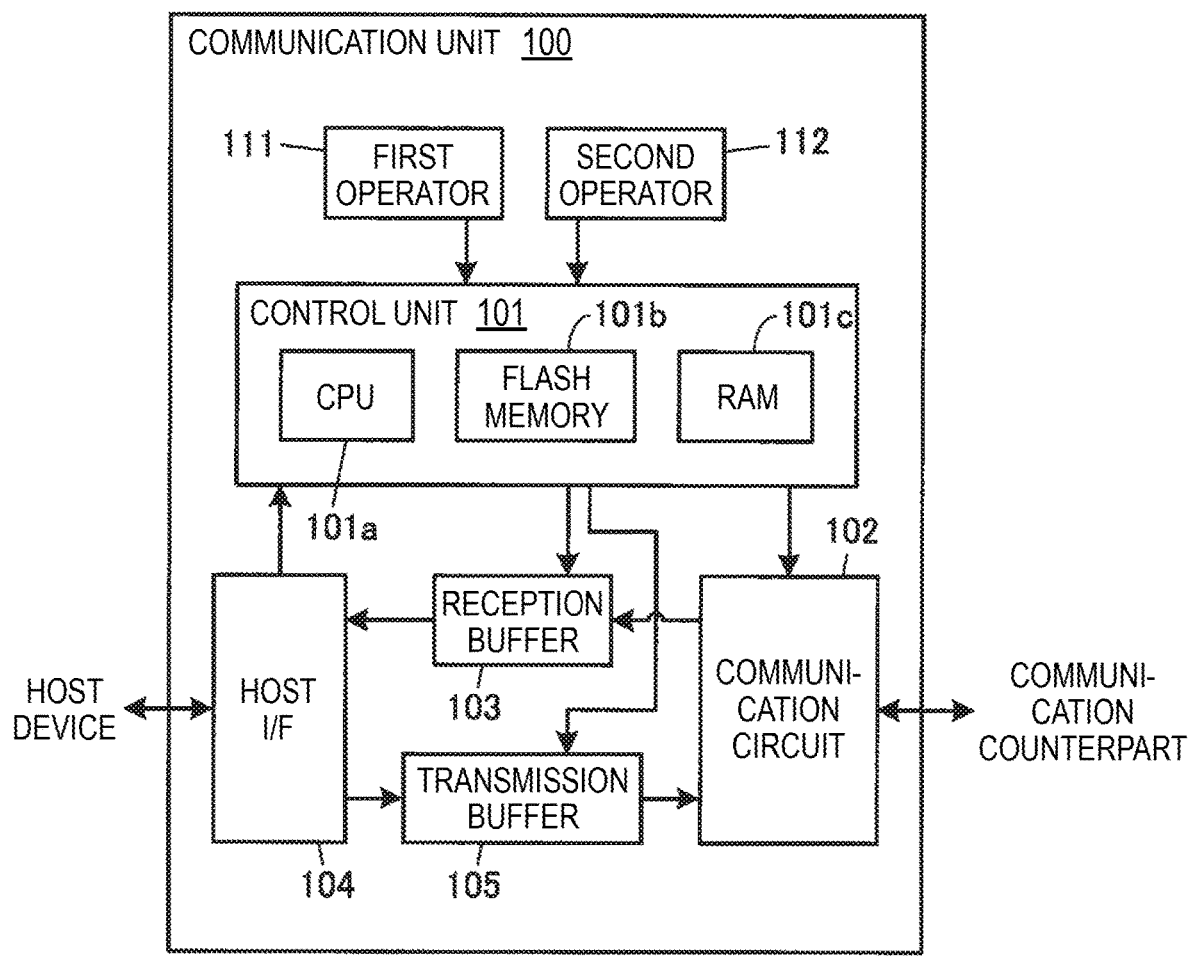
FIG. 1 shows a hardware configuration of a communication unit which is an embodiment of a data processing unit of the present disclosure.

First, FIG. 1 shows a hardware configuration of a communication unit which is an embodiment of a data processing unit of the present disclosure.

A communication unit 100 shown in FIG. 1 is used by being attached to an information processing device (host device) such as a sound signal processing device, and is a unit for adding a function of data communication by a specific protocol (here, MADI as an example) to a host device as an attachment destination. The communication unit 100 includes a control unit 101, a communication circuit 102, a reception buffer 103, a host interface (I/F) 104, a transmission buffer 105, a first operator 111, and a second operator 112.

Such a communication unit 100 can be configured as, for example, a network card attached to a slot of the host device.

The control unit 101 includes a CPU 101a, a flash memory 101b, and a RAM 101c, and has a function of integrally controlling an operation of the communication unit 100 by the CPU 101a executing a required program stored in the flash memory 101b. This function includes a function of setting a value of a parameter used for an operation of the communication circuit 102, the reception buffer 103, the transmission buffer 105, or the like, and a function of communicating with the host device via the host I/F 104, acquiring and providing the parameter values, and providing information on an operating state of the communication unit 100 to the host device. It goes without saying that the function of the control unit 101 may be realized by a dedicated control circuit.

The communication circuit 102 has a function of performing data communication using the specific protocol with another communication circuit or communication device corresponding to the specific protocol according to the parameter values set by the control unit 101 and transmitting and receiving data. In this embodiment, sound data is mainly assumed as data to be communicated by the communication circuit 102, but other data may be included. The communication circuit 102 stores the received data in the reception buffer 103, and transmits the data stored in the transmission buffer 105.

The reception buffer 103 is for temporarily storing data received by the communication circuit 102 and supplying the data to the host device via the host I/F 104 at a timing convenient for the host device. It is preferable that a buffer area for sound data and a buffer area for other data are separately provided.

The reception buffer 103 operates in a first-in first-out (FIFO) manner, but the timings of input and output may not necessarily be completely synchronized. The reception buffer 103 has a sampling rate converter (SRC) function, and can generate a sample of sound data at a timing indicated by a sampling clock of an arbitrary period by interpolation calculation or the like from each sample of sound data input in synchronization with a predetermined sampling clock from the communication circuit 102, and output the sample to the host I/F 104 in synchronization with the arbitrary sampling clock. In this case, each sample supplied from the communication circuit 102 is erased without being supplied to the host device.

The host I/F 104 has a function of exchanging data between the host device and the communication unit 100, and includes a terminal for connecting to the host device.

The transmission buffer 105 is for temporarily storing data supplied from the host device via the host I/F 104 and supplying the data to the communication circuit 102 at a timing suitable for data transmission by the communication circuit 102. It is preferable that a buffer area for the sound data and a buffer area for other data are separately provided. The transmission buffer 105 has the same function as the reception buffer 103 including the SRC function, except that directions of data transmission are different.

The first operator 111 is selectively set to one of a first state and a second state physically identified by a user operation. The first operator 111 is used to set the parameter values used for the operation of each unit of the communication unit 100, such as the communication circuit 102, the reception buffer 103, and the transmission buffer 105 according to the state of the second operator 112 or set the parameter values to values supplied from the host device. The first operator 111 may have any shape, such as a slide switch, a rocker switch, a push lock switch, or the like, but it is desirable to know which state the first operator is currently set to from the appearance thereof. In addition, it is desirable that the operator takes only two states, the first state and the second state. Specific aspects of the first state and the second state can be defined by, for example, presence and absence of electrical conduction between two terminals, and a resistance value, but the present disclosure is not limited thereto.

The second operator 112 is provided as one or more operators each corresponding to a parameter used for the operation of each unit of the communication unit 100, and is set to a physical state indicating a value of the corresponding parameter by the user operation. Typically, the DIP switch corresponds to the second operator 112, but the shape thereof is arbitrary, and similarly to the first operator 111, a slide switch, a rocker switch, a push lock switch, or the like can be adopted. The second operator 112 may be a switch that can take three or more states. The specific mode of each physical state that the second operator 112 can take can also be defined by, for example, electrical conduction between two terminals, and a resistance value, but the invention is not limited thereto. The control unit 101 detects the physical state of each of the operators 111, 112 by electrically measuring the conduction, the resistance value, and the like, and performs control according to the detected physical state.

The assignment of the parameter to the individual operator and the assignment of the value of the parameter to each state of the operator are as specifications described later with reference to FIG. 4. A correspondence relationship between the parameter and the operator may be one-to-one correspondence, but the value of one parameter may be defined by a combination of states of a plurality of operators. Conversely, a combination of values of the plurality of parameters may be defined by the state of one operator. Since a display for displaying the parameter value is not necessarily prepared, it is desirable that the second operator 112 also has a shape that indicates which physical state the operator is currently in from the appearance thereof.

Since the first operator 111 is different in use from the second operator 112, it is desirable to provide the first operator 111 and the second operator 112 to be easily distinguished by a user.

Figure 2:
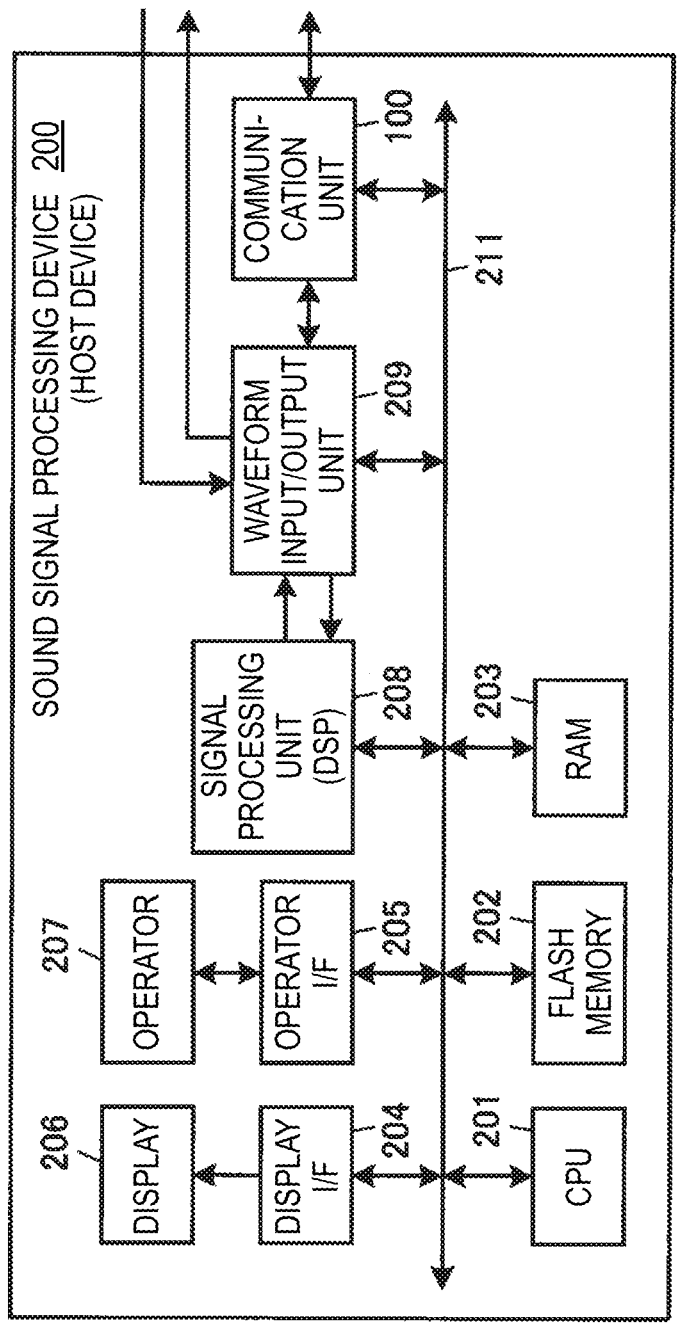
FIG. 2 shows a hardware configuration of a sound signal processing device which is an embodiment of an information processing device of the present disclosure and includes the communication unit shown in FIG. 1 in a detachable manner.

Next, FIG. 2 shows a hardware configuration of the sound signal processing device which is an embodiment of the information processing device of the present disclosure and includes the communication unit 100 shown in FIG. 1 in a detachable manner.

A sound signal processing device 200 shown in FIG. 2 includes a CPU 201, a flash memory 202, a RAM 203, a display I/F 204, an operator I/F 205, a signal processing unit (DSP) 208, and a waveform input/output unit (I/O) 209, which are connected by a system bus 211. A display 206 is connected to the display I/F 204, and an operator 207 is connected to the operator I/F 205. Further, the communication unit 100 shown in FIG. 1 is connected to the waveform I/O 209 and the system bus 211.

Such a sound signal processing device 200 can be configured as, for example, a digital mixer, and can also be configured as an amplifier device, a synthesizer, a recorder, an electronic musical instrument, or the like.

Figure 3:
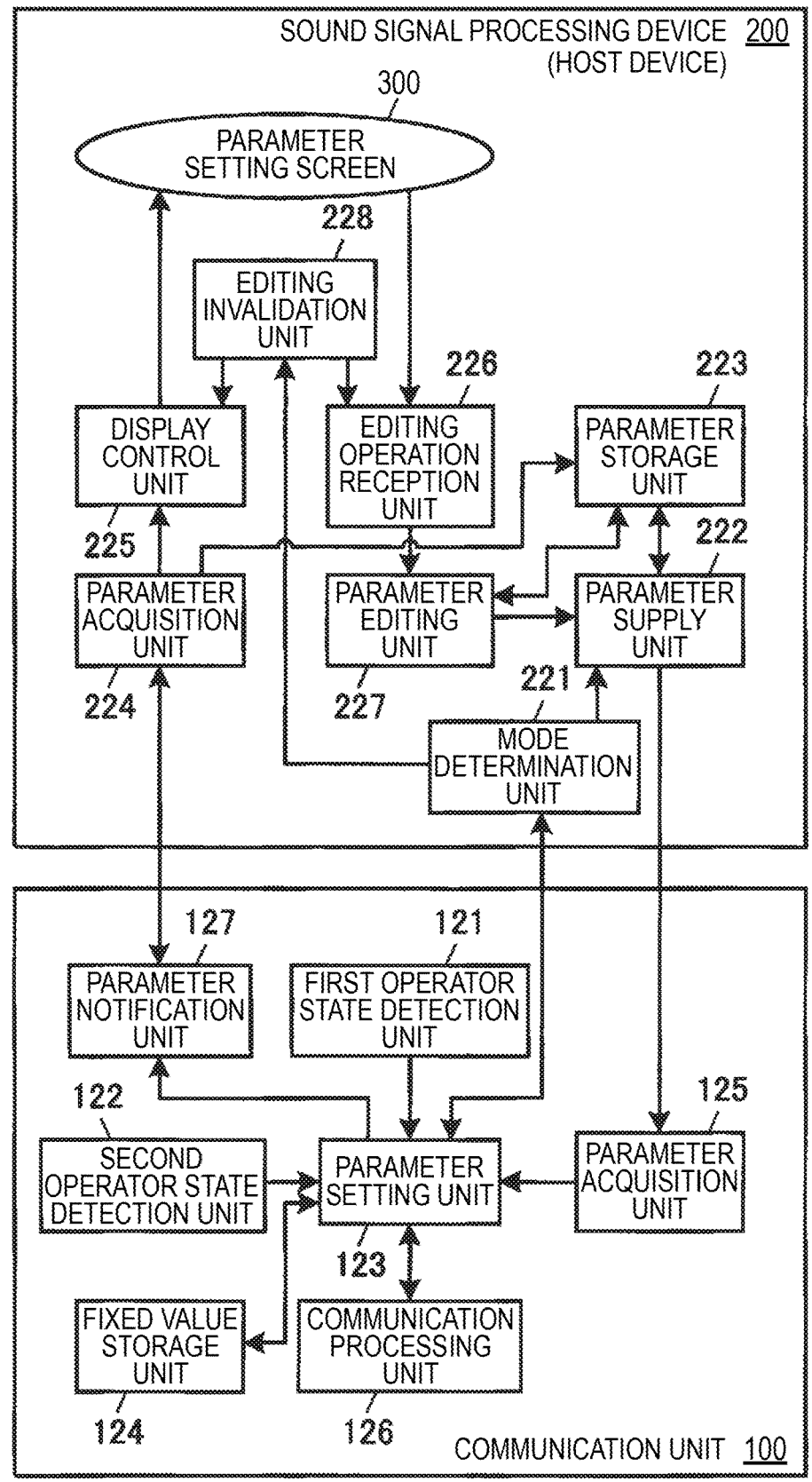
FIG. 3 shows a configuration of functions related to setting and editing of parameters for a communication unit provided in the communication unit shown in FIG. 1 and the sound signal processing device shown in FIG. 2.

Among the components shown in FIG. 2, the CPU 201 is a control unit that controls an overall operation of the sound signal processing device 200, and implements various functions including functions shown in FIG. 3 by executing a required program stored in the flash memory 202 and controlling required hardware.

The flash memory 202 is a rewritable nonvolatile storage unit that stores a program executed by the CPU 201, a value of a parameter to be set in the communication unit 100, or the like.

The RAM 203 is a storage unit that stores data to be temporarily stored and is used as a work memory of the CPU 201.

The display 206 can be configured by, for example, a liquid crystal panel (LCD) or a light emitting diode (LED) lamp. The display I/F 204 is an interface for enabling the CPU 201 to control the display of the display 206. The CPU 201 can cause the display 206 to display an operation state of the sound signal processing device 200 or display a screen for receiving an operation on the sound signal processing device 200 (including the communication unit 100 mounted thereon) by a lighting state of the lamp, the GUI, or the like.

The operator 207 is a component for receiving the user operation, and can be configured by various keys, buttons, sliders, rotary encoders, touch panels, or the like. The operator I/F 205 is an interface for allowing the CPU 201 to detect an operation performed on the operator 207.

The DSP 208 has a function of performing signal processing such as mixing and equalizing on a digital sound signal supplied from the waveform I/O 209, and outputting the sound signal after the signal processing to the waveform I/O 209 again.

The waveform I/O 209 is an interface for receiving the sound signal to be processed by the DSP 208 from an external device and outputting the processed sound signal to the external device. The waveform I/O 209 includes a terminal for inputting and outputting the sound signal without passing through the communication unit 100. When a communication function of the communication unit 100 is used, the waveform I/O 209 outputs the sound signal to be output to another device via the communication unit 100, and also acquires the sound signal from the other device via the communication unit 100.

The CPU 201 of the sound signal processing device 200 and the communication unit 100 can mutually transmit and receive data such as the value of the parameter used by the communication unit 100 and an operation mode of the communication unit 100 via the system bus 211 and a required interface.

One of the feature points of the communication unit 100 and the sound signal processing device 200 is that the communication unit 100 determines whether to use the value of the parameter set by the operator on the unit or the value of the parameter supplied from the host device (sound signal processing device 200) at the time of activation according to the state of the first operator 111. Hereinafter, this point will be described in detail.

FIG. 3 shows a configuration of functions related to setting of parameters for the communication unit 100 provided in the communication unit 100 and the sound signal processing device 200. Here, functions of the communication unit 100 side shown in FIG. 3 are realized by the CPU 101a of the control unit 101 executing firmware to control each unit in FIG. 1, and functions of the sound signal processing device 200 side are realized by the CPU 201 executing a required control program to control units except the communication unit 100 in FIG. 2. However, these functions may be realized by dedicated hardware, software, or a combination thereof.

As shown in FIG. 3, the communication unit 100 includes functions of a first operator state detection unit 121, a second operator state detection unit 122, a parameter setting unit 123, a fixed value storage unit 124, a parameter acquisition unit 125, a communication processing unit 126, and a parameter notification unit 127.

The first operator state detection unit 121 has a function of detecting, among the first state or the second state, which physical state the first operator 111 is currently in.

The second operator state detection unit 122 has a function of detecting a current physical state of each operator constituting the second operator 112 for each operator.

The parameter setting unit 123 has a function of setting the value of the parameter used for communication by the communication processing unit 126 in the communication processing unit 126 according to the physical state of the first operator 111.

More specifically, at the time of activating the communication unit 100, when the first operator 111 is in the first state, the parameter setting unit 123 sets a value of each parameter (first parameter) indicated by the physical state of each operator constituting the second operator 112 to the communication processing unit 126. When there is a parameter (second parameter) without the corresponding second operator 112, the value of the parameter is read from the fixed value storage unit 124 and set in the communication processing unit 126.

On the other hand, if the first operator 111 is in the second state, the parameter setting unit 123 sets each parameter value supplied from the sound signal processing device 200 through the parameter acquisition unit 125 to the communication processing unit 126. In this case, basically all necessary parameter values should be supplied from the sound signal processing device 200, but when there is a parameter to which no value is supplied, a default value is read out from the fixed value storage unit 124 for the parameter.

If the first operator 111 is in the second state, the parameter setting unit 123 sets the parameter value supplied from the sound signal processing device 200 to the communication processing unit 126 as required after the activation. The supply as required is performed, for example, when the user edits the parameter value in the sound signal processing device 200. In addition, the setting may be performed such that a new value is overwritten to the already set value only for the parameter supplied with the value. Further, when this setting is performed, the parameter setting unit 123 notifies the sound signal processing device 200 of the value of the parameter after overwriting (which may be only the overwritten parameter or all parameters) including the meaning of execution confirmation of the setting, via the parameter notification unit 127.

If the first operator 111 is in the first state, even if the parameter is supplied from the sound signal processing device 200, the parameter setting unit 123 simply rears and discards the parameter value and does not reflect the parameter value in the operation of the communication processing unit 126.

The parameter setting unit 123 also has a function of notifying the sound signal processing device 200 of information of the parameter value set in the communication processing unit 126 via the parameter notification unit 127 periodically or in response to a request from the sound signal processing apparatus 200, regardless of the state of the first operator 111. In addition, it is preferable to also notify the sound signal processing device 200 of a value of a parameter that cannot be set in the communication processing unit 126 and that is automatically detected and held by the communication processing unit 126.

Further, the parameter setting unit 123 also has a function of notifying the sound signal processing device 200 of information indicating the state of the first operator 111 (the operation mode of the communication unit 100 related to the setting of the parameter) in response to a request from the sound signal processing device 200.

The fixed value storage unit 124 has at least a function of storing default values of various parameters including the value set in the communication processing unit 126 in place of the value indicated by the second operator 112 at least for a parameter having no corresponding second operator 112.

The parameter acquisition unit 125 has a function of acquiring each parameter value supplied from the sound signal processing device 200.

The communication processing unit 126 has a function related to data communication including the SRC function implemented by the communication circuit 102, the reception buffer 103, and the transmission buffer 105 in FIG. 1.

The parameter notification unit 127 has a function of notifying the sound signal processing device 200 of the parameter value set or held in the communication processing unit 126.

Here, FIG. 4 shows an example of specifications related to parameters handled by the parameter setting unit 123. The communication unit 100 and the sound signal processing device 200 perform operations according to the specifications shown in FIG. 4, respectively.

The specifications shown in FIG. 4 include "item", "possible value", "DIP switch", "host control", and "current value".

Among them, the "item" indicates the name of each parameter handled by the parameter setting unit 123.

The "possible value" is a list of possible values of the parameter of a corresponding item. However, values in parentheses cannot be freely set by the parameter setting unit 123. For the parameters put in the parentheses in the "possible value", the communication processing unit 126 detects a value from the content of data received from a communication party, a reception status of data, or the like, and the parameter setting unit 123 receives and holds the detected value. Other parameters can be set by the parameter setting unit 123. The underlined values are default values set when not being specified, and the underlined values are stored in the fixed value storage unit 124.

Further, the order of description of values indicates the order of correspondence with data values when the parameter value of the corresponding item is represented as data of 1 bit or plural bits. When there are two possible values, the values correspond to binary values of "0" and "1" sequentially from the beginning. When there are three or four possible values, the values correspond to four values of "00", "01", "10", "11" sequentially from the beginning (If there are three values, the value corresponding to "11" will not be defined).

In the drawings, for ease of viewing, parentheses and underscores are used, but in actuality, the above contents may be expressed in a format easy to be handled as data. There may be parameter values represented by data of 3 bits or more.

The "DIP switch" is an ID of an operator (included in the second operator 112) used to indicate the parameter value of the corresponding item. Here, each of the operators constituting the second operator 112 is a two-state switch that expresses a binary value of 1-bit data, and two switched are associated with each other when the number of the possible values is three or four. When a three-state switch or a four-state switch is used, one switch is sufficient. In the two switches, which switch indicates an upper bit may be included in the "DIP switch", but the switch with a smaller ID may be defined in advance as the upper bit or the like. The second operator 112 associated with a "standby" parameter is not currently used for setting the parameter value.

For a parameter of which an ID of the "DIP switch" is "-" (NA: Not Available), the second operator 112 for setting a value is not prepared. The parameter for which the parameter setting unit 123 cannot set a value is that the ID of the "DIP switch" ID is "-". It may be determined arbitrarily by a designer of the communication unit which parameter is set to "-". Since there is little change, the inconvenience is small even if the setting in the second control 112 cannot be made, and a parameter or the like which has no particular problem even if change is performed on the sound signal processing device 200 side in a case where it is desired to change, can omit the corresponding second operator 112. As a result, the number of the second operators 112 can be reduced.

The "host control" indicates whether or not the value supplied from the host device (here, the sound signal processing device 200) is set as the value of the parameter of the corresponding item when the first operator 111 is in the second state, that is, whether or not the control by the host device is valid. "○" (valid) indicates that a value supplied from the host device is set, and "-" (invalid) indicates that the value is not set. In the embodiment, "host control" is "○" (valid) for all the parameters for which the parameter setting unit 123 can set values, but this is not essential. For a parameter that can be set but "host control" is "-" (invalid), even when the first operator 111 is in the second state, the value stored in the fixed value storage unit 124 may be set in the communication processing unit 126.

The "current value" is an example of a value, of the parameter of the corresponding item, currently set in the communication processing unit 126 (a value held in the communication processing unit 126 for a parameter that cannot be set). The parameter setting unit 123 updates the "current value" when the parameter value is set to the communication processing unit 126. For a parameter that cannot be set, it is preferable that the value is periodically acquired from the communication processing unit 126 to update the "current value".

The "current value" is an entity of data that is updated as required, and is different from the other items in FIG. 4.

Among the specific parameters shown in FIG. 4, "input clock sequence (Fs)" is a parameter indicating whether a series of input clocks used for reception of sound data by the communication circuit 102 is 44.1 kilohertz (kHz) or 48 kHz. "Input frame format" is a parameter indicating the format of a frame used by the communication circuit 102 to receive data. "Number of input channels" is a parameter indicating how many channels of a sound signal are received by the communication circuit 102. The values of these parameters are determined by another device transmitting the frame on which the data is placed, and the communication circuit 102 detects each parameter of the frame of the transmitted data and automatically determines and holds the parameters necessary for reception. Therefore, the "possible value" is in parentheses, the there is no corresponding second operator 112, and the "host control" is also "-" (invalid).

"Input clock magnification" is a parameter indicating how many times the frequency of the input clock used is that of the sequence indicated by "input clock sequence (Fs)". The parameter value can be set by two bits using two operators in the second operator 112, and the value transmitted from the sound signal processing apparatus 200 can also be set.

The "output frame format" and the "number of output channels" are parameters indicating the format of a frame used in data transmission by the communication circuit 102 and how many channels of the sound signal are transmitted. For these parameters, the corresponding second operator 112 is not provided, but the values supplied from the sound signal processing device 200 can be set. "Same as Input" is a set value indicating that a same value as the value of the corresponding parameter (here, "input frame format" and "number of input channels", respectively) on an input side is used. This is because, when data transmission and data reception are performed by one MADI cable, in general, the same format and the same number of channels are used for transmission and reception.

"Input SRC" is a parameter indicating the validity/invalidity of the SRC function in the reception buffer 103. "Input SRC clock" is a parameter for specifying a clock on the input side used for the SRC. "MADI IN" indicates that the communication circuit 102 uses a clock of the received sound data, "WCLK IN" indicates that a clock supplied from an external clock source independently from the sound data is used. "Output SRC" is a parameter indicating the validity/invalidity of the SRC function in the transmission buffer 105. "Output SRC clock" is a parameter for specifying a clock on the output side to be used for the SRC. "MADI IN" indicates that a clock of sound data corresponding to the sound data to be transmitted among the sound data received by the communication circuit 102 is used, and "WCLK IN" indicates that the clock supplied from the external clock source is used. The values of these four parameters can be set by one bit using one operator in the second operator 112, and the values transmitted from the sound signal processing device 200 can also be set.

As described above, the "standby" does not indicate information on a specific parameter.

FIG. 5 shows an example of data of parameter values to be stored in the sound signal processing device 200 side. The data shown in FIG. 5 is stored in the flash memory 202 so that the CPU 201 can appropriately refer to the data.

The "host side setting value" of the data shown in FIG. 5 is stored in a nonvolatile manner on the sound signal processing device 200 side for the parameter of which "host control" is "○" in the specifications shown in FIG. 4, and the value is used to be supplied to the communication unit 100 for initially setting in the communication processing unit 126. The "host side setting value" stores the same value as the "current value" at the time of final use of the communication unit 100. For a parameter of which he parameter the "host control" is "-", there is no "host side setting value".

Further, the sound signal processing device 200 stores a value of the "current value" acquired from the communication unit 100 as a "current value", and is used to display a parameter setting screen 300 (see FIG. 6) to be described later, and to restore a parameter value used immediately before the communication unit is activated.

Referring back to FIG. 3, the function of the sound signal processing device 200 will now be described.

The sound signal processing device 200 has functions of a mode determination unit 221, a parameter supply unit 222, a parameter storage unit 223, a parameter acquisition unit 224, a display control unit 225, an editing operation reception unit 226, a parameter editing unit 227, and an editing invalidation unit 228.

Among them, the mode determination unit 221 has a function of acquiring, from the communication unit 100, information on an operation mode of the communication unit 100 related to the setting of a parameter determined by the state of the first operator 111 in the communication unit 100 at the time of activating the communication unit 100. When the operation mode is the second state (the host side setting is used), a function is provided for instructing the parameter supply unit 222 to supply the parameter value stored in the parameter storage unit 223 to the communication unit 100. Here, for initial setting, the values of all parameters are supplied to the communication unit 100.

Further, when the operation mode of the communication unit 100 is the first state (see the second operator), the mode determination unit 221 also has a function of instructing the editing invalidating unit 228 to prohibit the editing of the host-side setting value on the parameter setting screen 300.

Next, the parameter supply unit 222 has a function of, in response to the instruction from the mode determination unit 221, reading the parameter value from the parameter storage unit 223 and supplying the parameter value to the communication unit 100 so as to be set in the communication processing unit 126. Similarly, the parameter supply unit 222 has a function of supplying a parameter value according to an instruction from the parameter editing unit 227 to be described later.

The parameter storage unit 223 has a function of storing a parameter value ("host side setting value" in FIG. 5) that is to be set in the communication processing unit 126 of the communication unit 100 edited on the sound signal processing device 200 side.

The parameter acquisition unit 224 has a function of acquiring the parameter value that is set or held in the communication processing unit 126 and notified from the parameter notification unit 127 of the communication unit 100, and managing the value as data of the "current value" in FIG. 5.

The display control unit 225 has a function of a second control unit that transmits data of a screen including the data of the "current value" in FIG. 5 to the display, and displays a parameter setting screen 300 (see FIG. 6) for displaying the parameter value and receiving an editing operation on the parameter value on the display 206 based on the "current value".

The editing operation reception unit 226 has a function of receiving an editing operation of the parameter value on the parameter setting screen 300 by the operator 207.

When the editing operation reception unit 226 receives the editing operation, the parameter editing unit 227 reads the "host side setting value" of the operated parameter from the parameter storage unit 223, passes the value after the change according to the operation to the parameter supply unit 222 to be supplied to the communication unit 100. Here, only the value of the operated parameter may be supplied.

When this supply is performed by the parameter supply unit 222, the parameter setting unit 123 sets the value of the supplied parameter in the communication processing unit 126 on the communication unit 100 side, and notifies the sound signal processing device 200 of the parameter value after the setting. When the parameter acquisition unit 224 updates the "current value" stored therein according to the value notified from the communication unit 100, an editing result of the parameter value is reflected on the parameter setting screen 300. At this time, the parameter acquisition unit 224 also reflects the editing result in the "host side setting value" stored in the parameter storage unit 223. That is, the parameter acquisition unit 224 functions as a first control unit, and transmits the value notified from the communication unit 100 to the parameter storage unit 223 to be overwritten and stored.

That is, after confirming that the editing result is reflected in the setting on the communication unit 100 side, the sound signal processing device 200 updates the "current value" and the "host side setting value". In this case, although the response to the display of the parameter setting screen 300 is slightly delayed, there is no particular problem because the editing of the parameters used by the communication unit 100 is not frequently changed. In this example, priority is given to surely matching the setting on the communication unit 100 side with the "host-side setting value". However, it is also conceivable that the response of the display is prioritized and that the parameter editing unit 227 updates the "current value" and the "host side setting value" before transmitting the changed parameter value to the communication unit 100.

With the function of each unit described above, when the mounted communication unit 100 is operating in the second state, the sound signal processing device 200 can arbitrarily edit the parameter value set in the communication unit 100 using the parameter setting screen 300. Even when the communication unit 100 is stopped (including a case of being removed), the parameter value at that time is held as the "host side setting value", and the same parameter value as that at the time of stopping can be automatically set to the next activated communication unit 100.

In addition, according to the instruction from the mode determination unit 221, when the operation mode of the communication unit 100 is in the first state, the editing invalidation unit 228 invalidates the function of the editing operation reception unit 226. The display control unit 225 also has a function of graying out the display of the value of each parameter on the parameter setting screen 300 and displaying that the setting operation is invalid. Here, in the first state, since the communication unit 100 operates without using the "host side setting value", the parameter value is not operated on the sound signal processing device 200 side.

On the other hand, the parameter value set in the communication processing unit 126 can be confirmed even if the state of the second operator 112 is not confirmed, and the parameter setting screen 300 is displayed even if the operation mode of the communication unit 100 is in the second state. This display is realized by the communication unit 100 notifying the sound signal processing device 200 of the parameter value set in the communication processing unit 126 regardless of the state of the first operator 111.

Figure 6:
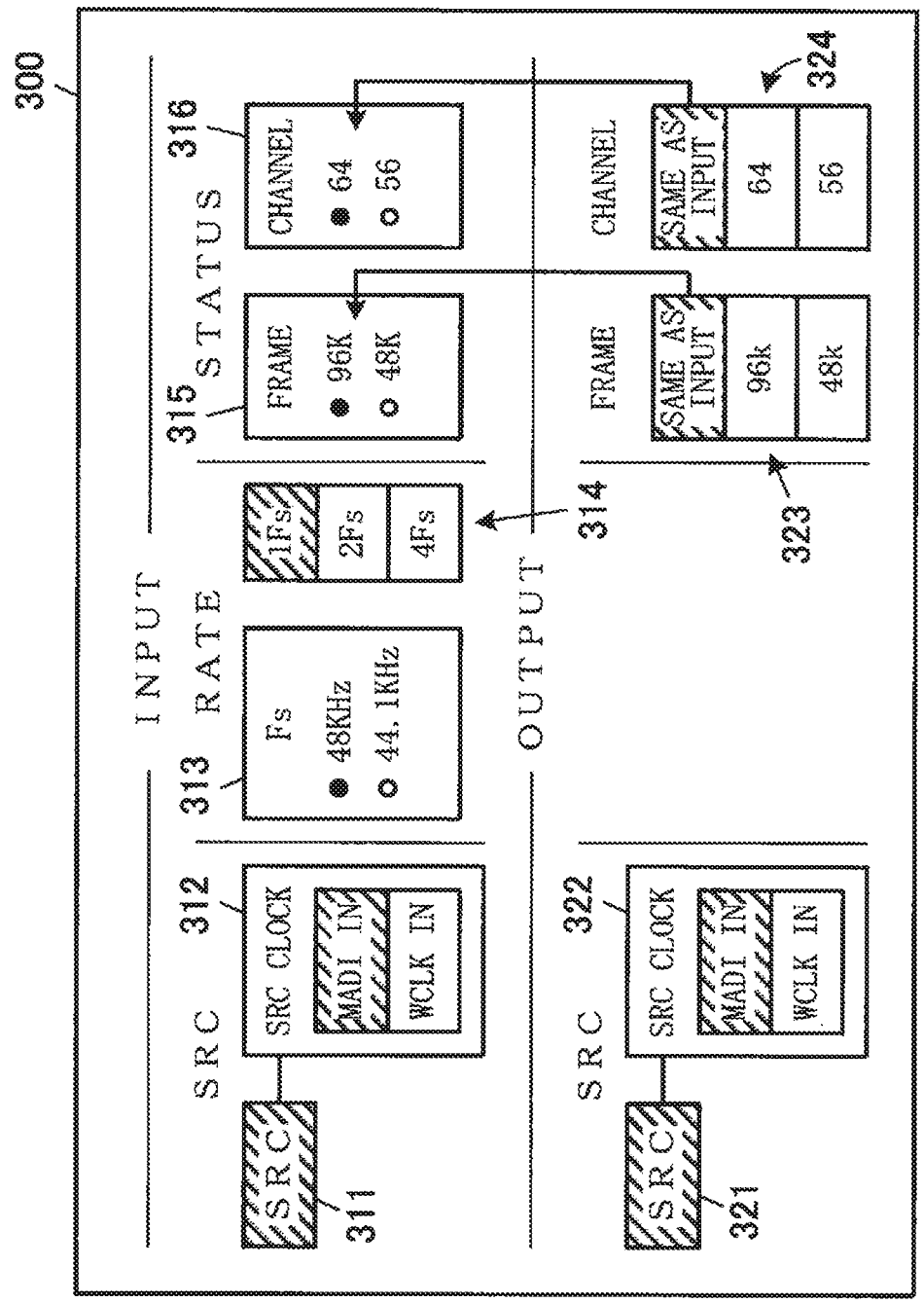
FIG. 6 shows a display example of a parameter setting screen.

Next, FIG. 6 shows a display example of the parameter setting screen 300.

The parameter setting screen 300 includes a display part (a virtual operator such as a knob or a button) for displaying the value of the parameter of each item shown in FIGS. 4 and 5 and receiving the editing operation. An upper stage is a display area for parameters on the input side, and a lower stage is a display area for parameters on the output side. Further, FIG. 6 shows a state in which the editing operation is valid.

An SRC setting unit 311 on the parameter setting screen 300 is a button for switching the parameter value of the "input SRC" by a toggle. In the drawing, an on-state is shown by hatching.

The SRC clock setting unit 312 is provided with a button for selectively setting the parameter value of the "input SRC clock". In the drawing, a state in which "MADI IN" with hatching is set is shown.

A clock sequence display unit 313, a frame format display unit 315, and a channel number display unit 316 are radio buttons that display values of parameters of "input clock sequence", "input frame format", and "number of input channels", respectively. Since the values of these parameters cannot be set, only the current values are displayed.

The clock magnification setting unit 314 includes a button for selectively setting the parameter value of the "input clock magnification".

An SRC setting unit 321, an SRC clock setting unit 322, a frame format setting unit 323, and a channel number setting unit 324 are operation units for setting and displaying values of parameters of "output SRC", "output SRC clock", "output frame format", and "number of output channels", respectively.

Next, processing executed by the communication unit 100 or the sound signal processing device 200 in order to realize the functions shown in FIG. 3 will be described with reference to FIGS. 7 to 10. Processing shown in these flowcharts is performed by executing a required program by the CPU 101a of the control unit 101 on the communication unit 100 side and the CPU 201 on the sound signal processing device 200 side. However, for convenience of description, it is assumed that the communication unit 100 or the sound signal processing device 200 executes the processing.

Figure 7:
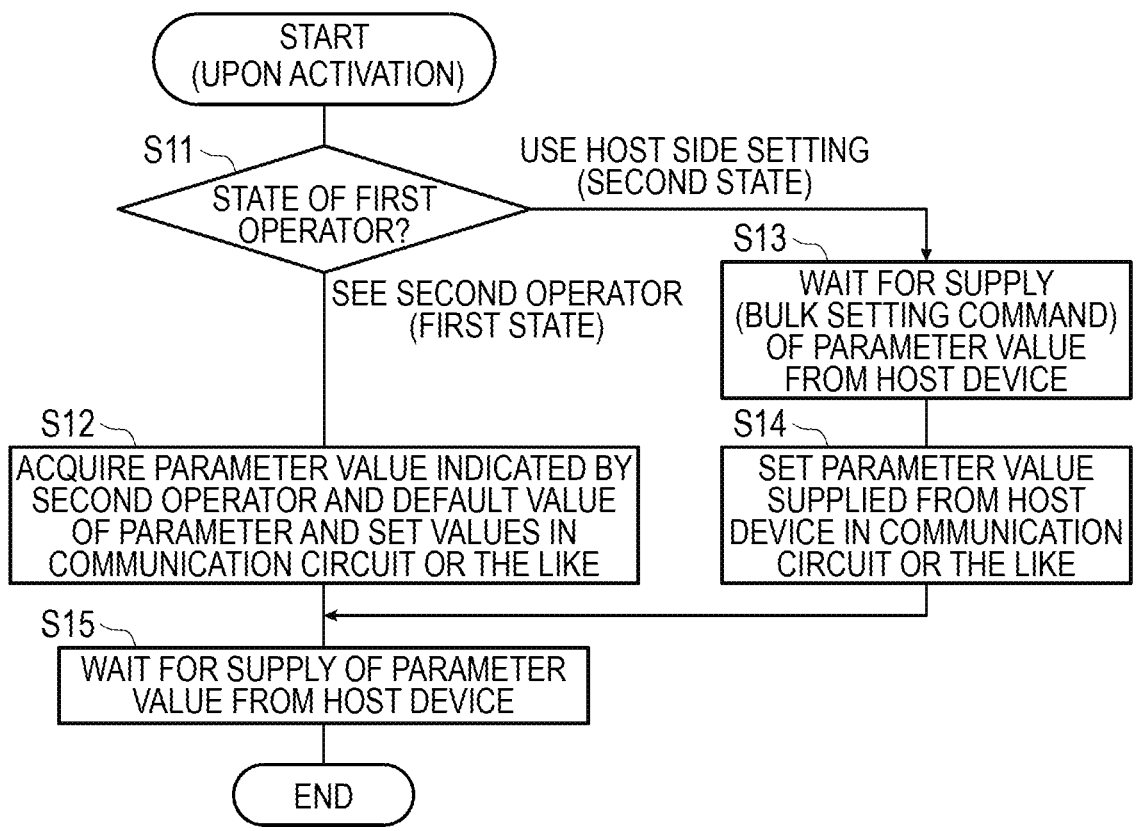
FIG. 7 is a flowchart of processing executed at a communication unit side at the time of activating itself.

First, FIG. 7 shows a flowchart of the processing executed by the communication unit 100 at the time of activating itself.

When activated, the communication unit 100 starts the processing shown in FIG. 7, and first detects the state of the first operator 111 (S11). Then, if the first operator 111 is in the first state, the state of the second operator 112 is detected, the value of the parameter indicated by the state of the second operator 112 and a default value for a parameter for which the second operator 112 is not provided is acquired, and is set in a processing circuit such as the communication circuit 102 (here, the communication circuit 102, the reception buffer 103, and the transmission buffer 105, unless otherwise specified) (S12). On the other hand, in the second state, the communication unit 100 waits for the supply (bulk setting command) of the parameter value from the host device (here, the sound signal processing device 200) (S13), and when there is a supply, the communication unit 100 sets the supplied parameter value in the communication circuit 102 or the like (S14). The processing of these steps S11 to S14 correspond to the functions of the first operator state detection unit 121, the second operator state detection unit 122, the parameter setting unit 123, and the parameter acquisition unit 125.

After step S12 or S14, the communication unit 100 notifies the sound signal processing device 200 of the values of all the parameters set or held in the communication circuit 102 or the like (S15), and ends the processing. The processing of step S15 corresponds to the functions of the parameter setting unit 123 and the parameter notification unit 127.

Figure 8:
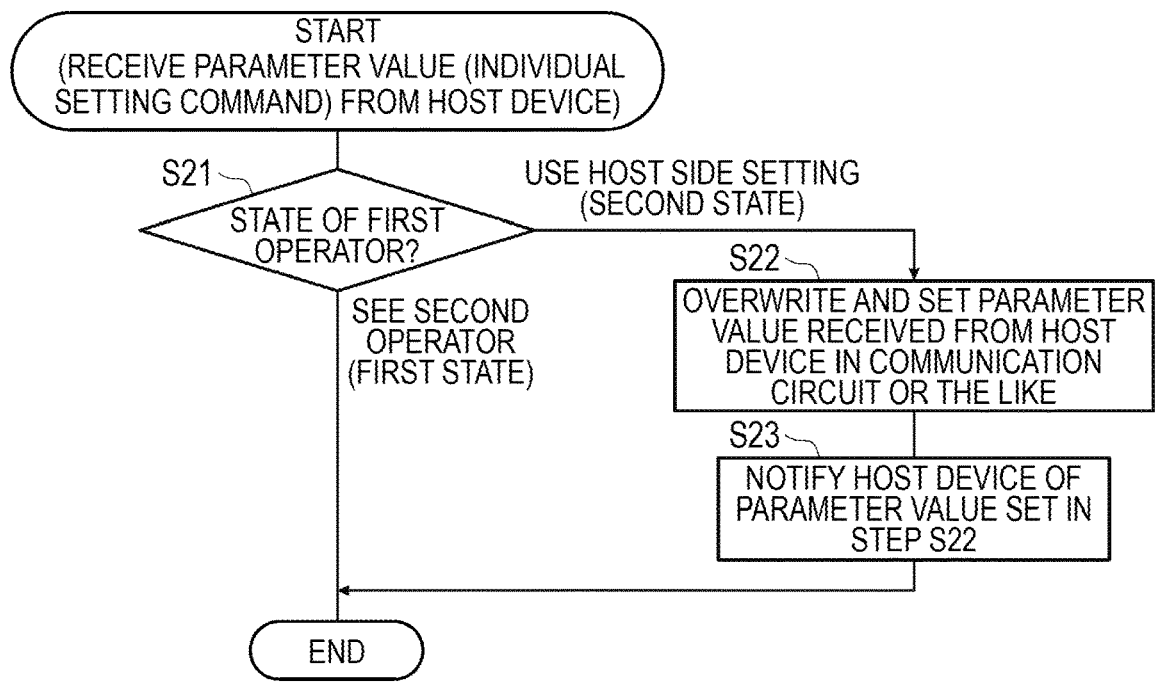
FIG. 8 is a flowchart of processing executed at the communication unit side when parameter values are individually received from a host device.

Next, FIG. 8 shows a flowchart of processing executed when the communication unit 100 individually receives parameter values from the host device.

Upon receiving the parameter value (individual setting command) from the host device, the communication unit 100 starts the processing shown in FIG. 8, and first detects the state of the first operator 111 (S21). The processing is the same as step S11 in FIG. 7. If the first operator 111 is in the second state, the parameter value received from the host device is overwritten and set in the communication circuit 102 or the like (S22). Here, only the parameter that has received the value may be set up. Thereafter, the communication unit 100 notifies the host device of the parameter value set in step S22 (S23), and ends the processing.

If it is determined that the first operator is in the first state in step S21, the communication unit 100 ignores the parameter value received this time and ends the processing.

In the above processing, the processing of step S22 corresponds to the functions of the parameter setting unit 123 and the parameter acquisition unit 125, and the processing of step S23 corresponds to the parameter setting unit 123 and the parameter notification unit 127, respectively.

Figure 9:
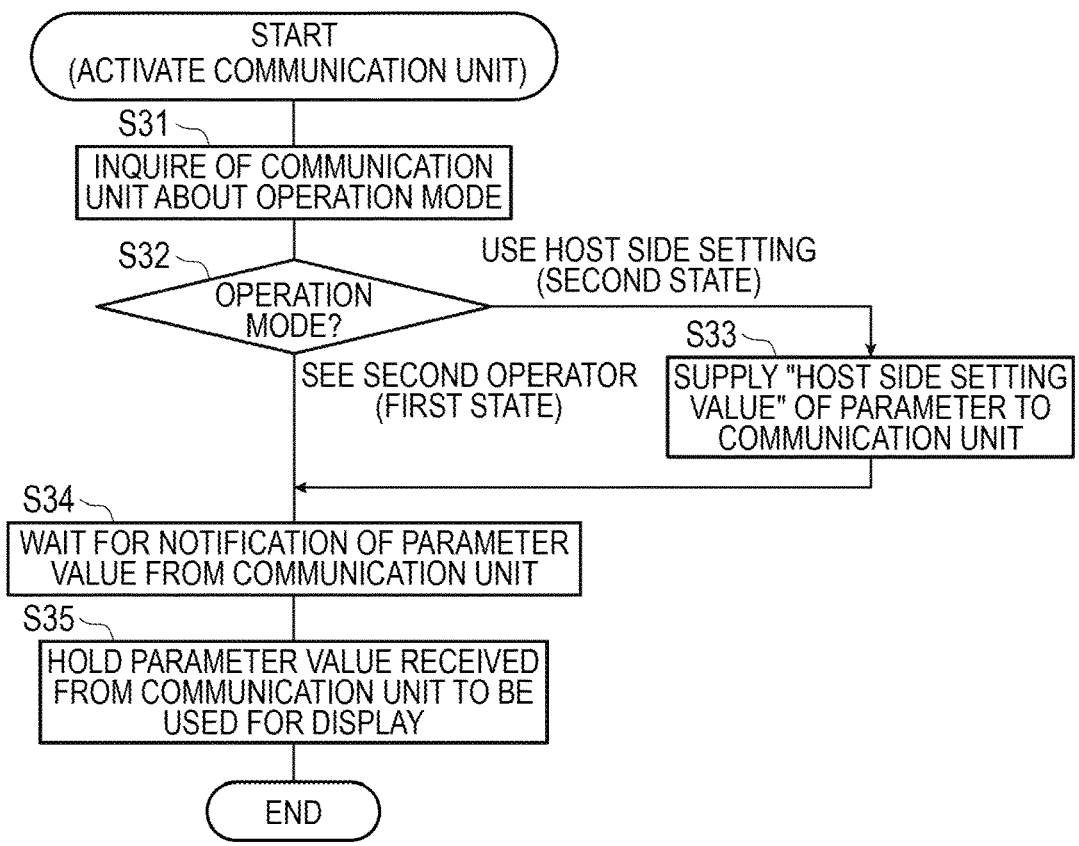
FIG. 9 is a flowchart of processing executed at a sound signal processing device side at the time of activating the communication unit.

Next, FIG. 9 shows a flowchart of processing executed by the sound signal processing device 200 at the time of activating the communication unit 100.

In the sound signal processing device 200, when a power is supplied to the sound signal processing device 200 in a state in which the communication unit 100 is mounted and the sound signal processing device 100 itself is activated, and a communication unit is newly mounted on the sound signal processing apparatus 200 during activation, the communication unit 100 is supplied with power and is activated, and at this time, the processing shown in FIG. 9 is started.

In the processing of FIG. 9, the sound signal processing device 200 first inquires of the communication unit 100 to be activated about the operation mode (S31). This operation mode is set as a state of the first operator 111. If the operation mode responded from the communication unit 100 is the second state (S32), the sound signal processing device 200 then supplies the "host side setting value" of the parameter to the communication unit 100 as the bulk setting command (S33). Based on the parameter value supplied here, the processing of step S14 in FIG. 7 is executed. If the first operator is in the first state in step S32, step S33 is skipped.

In either case, the sound signal processing device 200 then waits for a notification of the parameter value from the communication unit 100 (S34). When the notification made in step S15 of FIG. 7 is detected, the parameter value received from the communication unit 100 is held as a "current value" (see FIG. 5) to be used later for the display of the parameter setting screen 300 (S35), and the process is ended.

In the above processing, the processing in steps S31 and S32 corresponds to the function of the mode determination unit 221, the processing of step S33 corresponds to the function of the parameter supply unit 222, and the processing of steps S34 and S35 corresponds to the function of the parameter acquisition unit 224.

Figure 10:
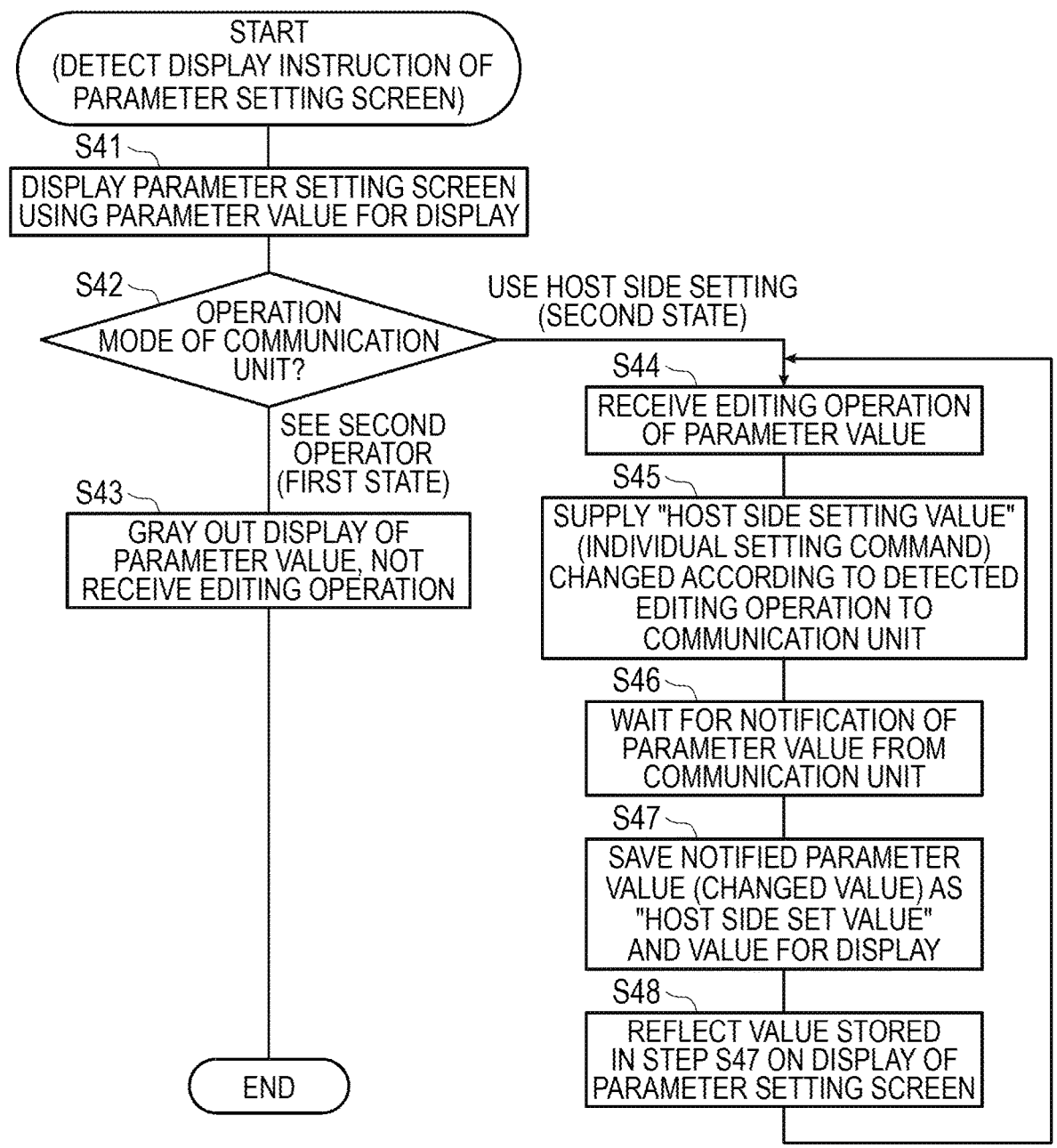
FIG. 10 is a flowchart of processing executed at the sound signal processing device side when a display instruction of the parameter setting screen is detected.

Next, FIG. 10 shows a flowchart of processing executed when the sound signal processing device 200 detects a display instruction of the parameter setting screen 300. Upon detecting the display instruction of the parameter setting screen 300, the sound signal processing device 200 starts the processing shown in FIG. 10, and displays the parameter setting screen 300 as shown in FIG. 6 on the display 206 using the parameter value held in step S35 in FIG. 9 (S41).

Next, the sound signal processing device 200 determines an operation mode of the communication unit 100 (S42). Since the operation mode of the communication unit 100 is not normally changed during the operation, if the value acquired in the processing of FIG. 9 is held, the operation mode can be determined based on the value.

If the operation mode is the first state in step S42, when the sound signal processing device 200 grays out the display (virtual operator) of the parameter value on the parameter setting screen 300 displayed in step S41, and does not receive the editing operation of the parameter value (S43), the processing is ended.

In the processing up to this point, the processing of step S41 corresponds to the function of the display control unit 225, the processing of step S42 corresponds to the function of the mode determination unit 221, and the processing of step S43 corresponds to the function of the editing invalidation unit 228.

On the other hand, if the operation mode is the second state in step S42, the sound signal processing device 200 displays the virtual operator in the normal state in which the virtual operator is not grayed out on the parameter setting screen 300, and receives the editing operation of the parameter value (S44). When the editing operation for any of the virtual operators is detected, the "host side setting value" (individual setting command) of the parameter corresponding to the virtual operator changed according to the detected editing operation is supplied to the communication unit 100 (S45). At this point, the change is not yet reflected in the stored "host side setting value".

Thereafter, the communication unit 100 executes the processing of FIG. 8 in response to the supply of the individual setting command in step S45, and notifies the sound signal processing devices 200 of the set parameter value, so that the sound signal processing device 200 waits for the notification (S46). When there is a notification, the sound signal processing device 200 saves the notified parameter value (which should be the same as the value supplied in step S45) as the "host side set value" and the value held for display on the parameter setting screen 300 (S47). Thereafter, the value stored in step S47 is reflected on the display of the virtual operator of the parameter setting screen 300 (S48), and the processing returns to step S44.

Thereafter, the sound signal processing device 200 repeats the processing of steps S44 to S48 until an instruction to close the parameter setting screen 300 is detected, and when the instruction to close the parameter setting screen 300 is detected, the parameter setting screen 300 is closed by interrupt processing, and the processing of FIG. 10 is also ended.

In the above processing, the processing of step S44 corresponds to the function of the editing operation reception unit 226, the processing of step S45 corresponds to the functions of the parameter editing unit 227 and the parameter supply unit 222, the processing of steps S46 and S47 corresponds to the function of the parameter acquisition unit 224, and the processing of step S48 corresponds to the function of the display control unit 225.

According to the communication unit 100 of the embodiment described above, by operating the first operator 111, the user can select any one of the setting by the second operator 112 and the setting by the host device and reflect the selected one in the operation of the communication circuit 102 or the like. Therefore, when the user can use the parameter setting function of the host device side, if the setting supplied from the host device is selected, the values of a large number of parameters can be arbitrarily set, and the setting before replacement can be used without re-setting even when the communication unit 100 is replaced. Further, even if the user is unfamiliar with the parameter setting function on the host device side or even when the host device does not have the parameter setting function, setting of the communication unit 100 can be performed while visually confirming the setting state by using the setting by the second operator 112.

Therefore, high convenience can be obtained in setting parameters in the communication unit 100. Further, when it is desired to operate for a long time with the same setting, if the fixed setting is made by the physical operator, it is possible to reduce the risk of erroneously changing the setting by setting using the GUI.

As described above, according to the present embodiment, it is possible to improve the convenience of setting the parameter in the data processing unit including the processing circuit that processes data according to the parameter.

Although the description of the embodiment has been completed, it goes without saying that the specific configuration of the device, the type of the parameter to be handled, the possible value, the specific procedure of the processing, and the like are not limited to those described in the above embodiment.

For example, in the above-described embodiment, the value of the parameter set in the communication processing unit 126 is set by the second operator 112 or the virtual operator of the parameter setting screen 300, and the parameter setting unit 123 can be used. However, instead of the parameter value itself, a difference value from a currently set value or a relative value based on a predetermined value may be set and used in the parameter setting unit 123. In this case, since the value of the parameter set by the second operator 112 or the parameter setting screen 300 and the value of the parameter to be actually set in the communication processing unit 126 do not necessarily coincide with each other, it is preferable that the parameter setting unit 123 performs conversion processing.

In addition, although the communication unit 100 mounted in the sound signal processing device 200 has been described as an example in the above embodiment, the configuration of the information processing device and the data processing unit is not limited thereto.

First, it is not necessary for the data processing unit to be incorporated in the information processing device or mounted therein, and the data processing unit may be externally connected via a required interface such as a Universal Serial Bus (USB). That is, the data processing unit and the information processing device can be configured as independent devices. Further, it is not necessary for the information processing device to include a function of sound signal processing and a dedicated processor for the function, and the information processing device may be a general-purpose computer. Of course, it may be a device including dedicated hardware for some function other than the sound signal processing. Furthermore, the data processing performed by the data processing unit is not necessarily communication. The data processing may be processing of a sound signal or any other information processing. It may be processing that is completed inside the data processing unit.

Figure 11:
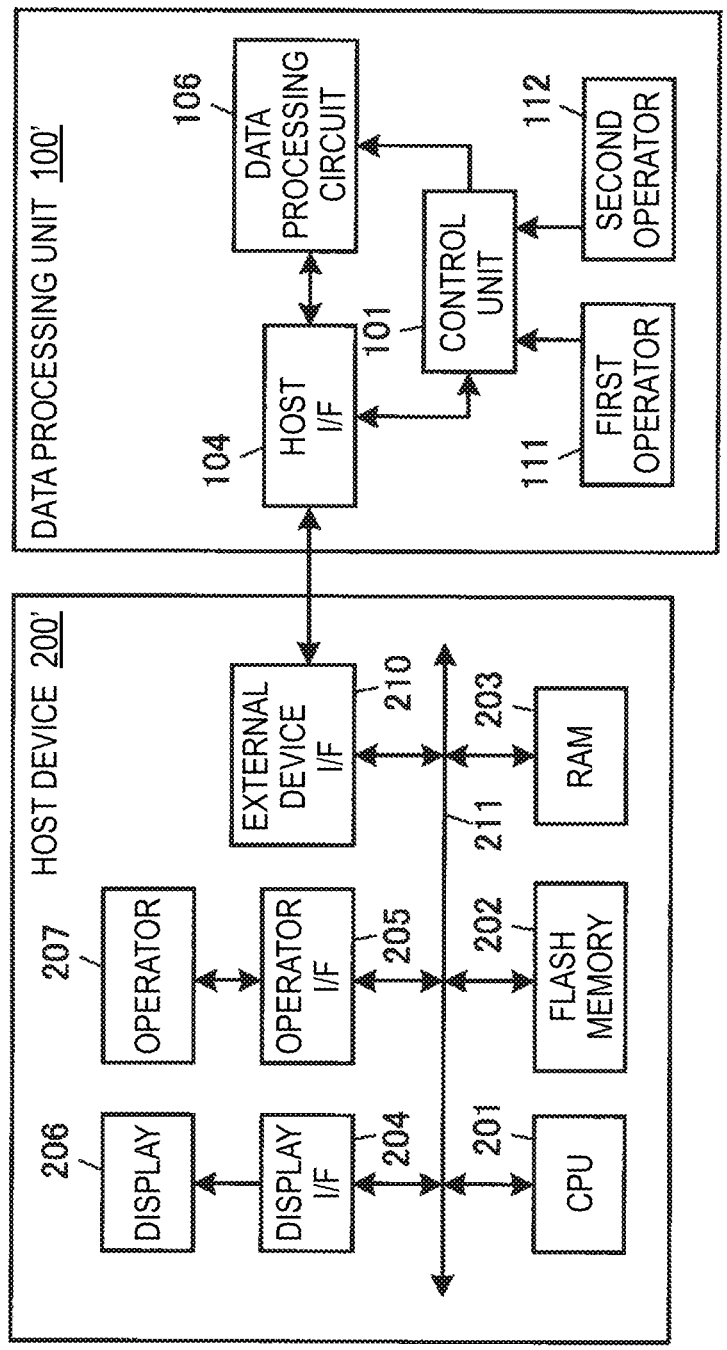
FIG. 11 shows a hardware configuration of a modification of the information processing device and the data processing unit of the present disclosure.

FIG. 11 shows a hardware configuration of a modification of the information processing device and the data processing unit according to the present disclosure in consideration of these points. In FIG. 11, a host device 200' is an embodiment of the information processing device, a data processing unit 100' is an embodiment of the data processing unit, and the same reference numerals as in FIG. 1 or FIG. 2 denote the same components as in FIG. 1 or FIG. 2.

The host device 200' of FIG. 11 is configured as a general-purpose computer, and does not include the DSP 208 and the waveform input/output unit 209. The data processing unit 100' is configured as an external device connected to an external device I/F 210.

Also in the data processing unit 100', a data processing circuit 106 is provided in place of the communication circuit 102, the reception buffer 103, and the transmission buffer 105. The data processing circuit 106 corresponds to a processing circuit that processes data according to a parameter value set by the second operator 112 or the host device 200'. The contents of the data processing are arbitrary.

Even with such a configuration, it is possible to obtain the same effect as in the case of the above-described embodiment for setting the parameter value for the data processing unit 100'.

In addition, in the embodiment described above, an example has been described in which the editing of the "host-side setting value" of the parameter is performed in the host device in a state in which the editing result is supplied to the communication unit 100 as required. However, this is not essential, and in addition to or instead of such editing, a function of editing the "host side setting value" may be provided only on the host device side in a state in which the editing result is not supplied to the communication unit 100. In the case of this function, it is not necessary to worry about whether the mode of the communication unit 100 is the first state or the second state at the time of editing, and the editing can be performed even when the communication unit 100 is not connected to the host device. The "host side setting value" edited in this way may be placed in a state that can be reflected in the setting of the communication unit 100 as in the case of the above-described embodiment, according to an instruction of the user after completion of editing.

The parameter storage unit 223 in the above-described embodiment may not be provided inside the sound signal processing device 200, and may be provided in an external storage device connected to the sound signal processing device 200 via a network or the like, or in a storage unit of a storage server in a cloud environment. In this case, the parameter supply unit 222 can store the value of the parameter value in the parameter storage unit 223 by transmitting the parameter to be stored in the parameter storage unit 223 (with a predetermined command as necessary) to the storage device or the like.

All or a part of the display 206 and the operator 207 may not incorporated in the sound signal processing device 200, and may be an external device connected to the sound signal processing device 200. In this case, the display control unit 225 can display the parameter setting screen 300 by transmitting the parameter value to be displayed on the external display or image data or drawing data of the screen for displaying the parameter value (with the predetermined command as necessary) to the display. Further, a required interface can be provided to receive the content of an operation received by an external operator.

In addition, the configurations and modifications described above can be combined appropriately and applied as long as no contradiction arises. Conversely, it is not necessary for the device according to the invention to be provided with all the configurations of the device of the above-described embodiment at the same time.

As apparent from the above description, according to the present disclosure, it is possible to provide a data processing unit having high convenience in setting a parameter as a data processing unit including a processing circuit for processing data according to the parameter.

Some reference signs used in the specification and drawings are listed below.

100, 100': communication unit
101: control unit
101*a*, 201: CPU
101*b*, 202: flash memory 101c, 203: RAM
102: communication circuit
103: reception buffer
104: host interface (I/F)
105: transmission buffer
106: data processing circuit
111: first operator
112: second operator
121: first operator state detection unit
122: second operator state detection unit
123: parameter setting unit
124: fixed value storage unit
125, 224: parameter acquisition unit
126: communication processing unit
127: parameter notification unit
200: sound signal processing device (host device)
204: display I/F
205: operator I/F
206: display
207: operator
208: signal processing unit (DSP)
209: waveform input/output unit (I/O)
210: external device I/F
211: system bus
221: mode determination unit
222: parameter supply unit
223: parameter storage unit
224: parameter acquisition unit
225: display control unit
226: editing operation reception unit
227: parameter editing unit
228: editing invalidation unit
300: parameter setting screen

What is claimed is:

1. A data processing unit configured to be connected to an information processing device, the data processing unit comprising:
a processing circuit that is configured to process data based on a value of a first parameter that has been set;
a first operator that is selectively set by a user to one of a first state and a second state that are physically identified;
a second operator that is set by the user to a physical state indicating the value of the first parameter; and
a processor that is configured to:
determine whether the first operator is in the first state or the second state at a time of activation of the data processing unit,
set the value of the first parameter indicated by the physical state of the second operator in the processing circuit in a case where the processor determines that the first operator is in the first state at the time of activation of the data processing unit,
set a value of the first parameter supplied from the information processing device in the processing circuit in a case where the processor determines that the first operator is in the second state at the time of activation of the data processing unit,
edit the value of the first parameter to be set in the data processing device according to a user operation,
set the edited value of the first parameter to the data processing device in response to the value of the first parameter being edited, and
set the value of the first parameter individually supplied from the information processing device at an arbitrary timing while the first operator is in the second state.

2. The data processing unit according to claim 1, wherein data processing performed by the processing circuit is data transmission and/or data reception.

3. The data processing unit according to claim 1, wherein the processing circuit is configured to perform the processing of data based on a value of a second parameter in addition to the value of the first parameter, and
wherein the processor is configured to:
set the value of the first parameter indicated by the physical state of the second operator and a predetermined value of the second parameter in the processing circuit in the case where the processor determines that the first operator is in the first state at the time of activation of the data processing unit, and
set the value of the first parameter and a value of the second parameter supplied from the information processing device in the processing circuit in the case where the processor determines that the first operator is in the second state at the time of activation of the data processing unit.

4. The data processing unit according to claim 3, further comprising:
a storage unit that stores the predetermined value of the second parameter in advance.

5. The data processing unit according to claim 1, wherein the processor is further configured to set, in the processing circuit, values of the respective parameters individually supplied from the information processing device at an arbitrary timing while the first operator is in the second state.

6. The data processing unit according to claim 5, wherein the processor is further configured to notify the information processing device of the values of the respective parameters set in the processing circuit regardless of the state of the first operator.

7. An information processing device including a data processing unit,
the data processing unit including:
a processing circuit that is configured to process data based on a value of a first parameter that has been set;
a first operator that is selectively set by a user to one of a first state and a second state that are physically identified;
a second operator that is set by the user to a physical state indicating the value of the first parameter; and
a processor that is configured to:
determine whether the first operator is in the first state or the second state at a time of activation of the data processing unit,
set the value of the first parameter indicated by the physical state of the second operator in the processing circuit in a case where the processor determines that the first operator is in the first state at the time of activation of the data processing unit, and
set the value of the first parameter supplied from the information processing device in the processing circuit in a case where the processor determines that the first operator is in the second state at the time of activation of the data processing unit, and
the information processing device comprising:
a memory storing instructions; and
a processor configured to implement the instructions and execute:
a supply task that is configured to supply the value of the first parameter to the data processing unit in a case where the first operator is in the second state at the time of activation of the data processing unit; and an editing task that is configured to edit the value of the first parameter to be set in the data processing unit according to a user operation, wherein the supply task supplies the edited value of the first parameter to the data processing unit in response to the value of the first parameter being edited by the editing task, and wherein the processor of the data processing unit sets, in the processing circuit, the value of the first parameter individually supplied from the information processing device at an arbitrary timing while the first operator is in the second state.

8. The information processing device according to claim 7, wherein the data processing unit is detachable from the information processing device.

9. The information processing device according to claim 7, wherein the processor of the information processing device further executes:

a control task that is configured to transmit the value of the first parameter set in the data processing unit to a storage unit based on a notification from the data processing unit, wherein at the time of activation of the data processing unit, the supply task supplies the value of the first parameter, which was stored in the storage unit when the data processing unit was last stopped, to the data processing unit.

10. The information processing device according to claim 7, wherein the processor of the information processing device further executes:

an invalidation task that is configured to invalidate editing by the editing task while the first operator in the data processing unit is in the first state.

11. The information processing device according to claim 7, wherein the processor of the information processing device further executes:

a control task that is configured to transmit the value of the first parameter set in the data processing circuit of the data processing unit to a predetermined display based on a notification from the data processing unit, wherein the processor of the data processing unit notifies the information processing device of the value of the first parameter set in the processing circuit regardless of the state of the first operator.

12. An information processing method executable by a data processing unit configured to be connected to an information processing device and including: a processing circuit that is configured to process data based on a value of a first parameter that has been set; a first operator that is selectively by a user set to one of a first state and a second state physically identified; and a second operator that is set by the user to a physical state indicating the value of the first parameter, the information processing method comprising:

determining whether the first operator is in the first state or the second state at a time of activation of the data processing unit;

setting the value of the first parameter indicated by the physical state of the second operator in the processing circuit in a case where it is determined that the first operator is in the first state at the time of activation of the data processing unit;

setting a value of the first parameter supplied from the information processing device in the processing circuit in a case where it is determined that the first operator is in the second state at the time of activation of the data processing unit;

editing the value of the first parameter to be set in the data processing unit according to a user operation;

setting the edited value of the first parameter to the data processing unit in response to the value of the first parameter being edited; and setting the value of the first parameter individually supplied from the information processing device at an arbitrary timing while the first operator is in the second state.

13. The information processing method according to claim 12, further comprising sending a notification to the information processing device to thereby cause the information processing device to transmit the value of the first parameter to the data processing unit.

14. The information processing method according to claim 12, further comprising notifying the information processing device of the value of the first parameter set in the processing circuit regardless of the state of the first operator.

* * * * *